United States Patent
Kim et al.

(10) Patent No.: US 10,978,875 B2
(45) Date of Patent: Apr. 13, 2021

(54) ON-SITE ESS MANAGEMENT DEVICE

(71) Applicant: GRIDWIZ INC, Gyeonggi-do (KR)

(72) Inventors: Ku Hwan Kim, Gyeonggi-do (KR);
June Woo Ryu, Gyeonggi-do (KR);
Hyun Woong Kim, Gyeonggi-do (KR);
Yun Ho Jung, Gyeonggi-do (KR)

(73) Assignee: GRIDWIZ INC, Gyeonggi-do (KR)

( * ) Notice: Subject to any disclaimer, the term of this patent is extended or adjusted under 35 U.S.C. 154(b) by 58 days.

(21) Appl. No.: 16/329,511

(22) PCT Filed: Apr. 13, 2017

(86) PCT No.: PCT/KR2017/004018
§ 371 (c)(1),
(2) Date: Feb. 28, 2019

(87) PCT Pub. No.: WO2018/043862
PCT Pub. Date: Mar. 8, 2018

(65) Prior Publication Data
US 2019/0199095 A1    Jun. 27, 2019

(30) Foreign Application Priority Data
Sep. 6, 2016  (KR) .......................... 10-2016-0114601

(51) Int. Cl.
*H02J 3/32*  (2006.01)
*H02J 3/28*  (2006.01)
*H02J 7/00*  (2006.01)

(52) U.S. Cl.
CPC ........ *H02J 3/32* (2013.01); *H02J 3/28* (2013.01); *H02J 7/00* (2013.01); *H02J 7/0013* (2013.01); *H02J 7/0047* (2013.01); *Y04S 40/20* (2013.01)

(58) Field of Classification Search
CPC .... H02J 7/00; H02J 3/32; H02J 7/0047; H02J 7/0013; H02J 3/28; H02J 2203/20; Y04S 40/20
USPC .............................. 320/134, 128; 307/31, 38
See application file for complete search history.

(56) References Cited

U.S. PATENT DOCUMENTS

2014/0239913 A1* 8/2014 Kudo ........................ H02J 3/32
320/134

FOREIGN PATENT DOCUMENTS

| JP | 2011-101553 A | 5/2011 |
|---|---|---|
| KR | 10-1262265 B1 | 5/2013 |
| KR | 10-1500304 B1 | 3/2015 |
| KR | 10-1504170 B1 | 3/2015 |
| KR | 10-2016-0012108 A | 2/2016 |

OTHER PUBLICATIONS

International Search Report for PCT/KR2017/004018 dated Jul. 14, 2017.
Written Opinion of the International Searching Authority for PCT/KR2017/004018 dated Jul. 14, 2017.

* cited by examiner

*Primary Examiner* — Arnold M Kinkead
(74) *Attorney, Agent, or Firm* — The PL Law Group, PLLC

(57) ABSTRACT

An on-site ESS management device includes an editing part for selectively grouping a plurality of grid parts when a plurality of grid parts including at least one of a battery and a power converter connected to the battery are provided, a selection part for selecting a specific group, and a management part for managing the power input and output of each grid part included in the specific group.

6 Claims, 4 Drawing Sheets

ON-SITE ESS MANAGEMENT DEVICE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/004018, filed on Apr. 13, 2017, which claims priority to the benefit of Korean Patent Application No. 10-2016-0111319 filed on Aug. 31, 2016 and 10-2016-0114601 filed on Sep. 6, 2016 in the Korean Intellectual Property Office, the entire contents of which are incorporated herein by reference.

TECHNICAL FIELD

The present invention relates to an on-site energy storage system (ESS) management device that manages power of a battery.

BACKGROUND ART

An energy storage system (ESS) consists of a battery, a PCS, and a PMS (EMS). The PMS provides an algorithm and UI in such a manner to issue, control, monitor, and operate instructions so that the battery is charged and the PCS is converted in power in connection with BMS information of the installed battery and PCS status information when the customer wants to charge the battery.

SUMMARY

An object of the present invention is to provide an on-site ESS management device capable of freely grouping and managing a plurality of batteries.

An on-site ESS management device according to the present invention includes when a plurality of grid units including at least one of a battery and a power converter connected to the battery is provided, an editing unit selectively grouping the plurality of grid units; a selection unit selecting a specific group; and a management unit managing power input and output of each grid unit included in the specific group.

The on-site ESS management device according to the present invention may further include a display unit displaying an interface in which management information of the specific group selected by the selection unit is included except management information of remaining groups.

The on-site ESS management device according to the present invention may further include a power supply unit that is charged by an external power, the power supply unit may provide the charging power to the load until the charging power satisfies the set value.

According to an on-site ESS management device of the present invention, a plurality of grid units may be freely grouped by using an editing unit.

In addition, it is possible to manage a specific group selected using the selection unit and the management unit.

According to the editing unit, a plurality of grid units provided in various sites can be grouped in various ways. A specific group selected by the selection unit among the groups generated by the editing unit can be managed by the management unit. The specific grid unit can be easily incorporated into the management target of the management unit or easily released from the management target of the management unit through the selective grouping performed by the editing unit.

A typical power management system (PMS) has an off-site characteristic that can manage only the power input and output of the grid units installed at sites within a limited range.

On the other hand, the management unit according to the present invention has an on-site characteristic in which a plurality of grid units can be selectively managed by the editor unit regardless of sites. Therefore, it is possible to exclude a programming task of adding a new grid unit to an existing management target or a programming task of deleting a grid unit included in an existing management target.

Further, the grid unit managed by the management unit of the present invention can be easily replaced in a group unit by the selection unit. In this case, the replacement in the group unit may be implemented by simply replacing and operating the management module provided for each group at the request of the selection unit. Therefore, according to the present invention, it is possible to exclude a programming operation for deleting an existing management target and adding a new management object.

In addition, when a maximum number of grid units that can be managed by the management unit are grouped into one specific group through the editing unit, the management unit can perform a function of an energy management system (EMS) managing the entire grid units within the range beyond a function of the PMS managing some grid units within the range.

When an abnormality occurs in the primary management module managing a specific group, the management unit can allow the sub-management module managing the other group to manage the specific group so that a specific group of the management target is reliably managed. In this case, since the sub management module may enter a standby mode due to the operation of the primary management module, it is possible to use the resources for managing the other group to manage the specific group.

The power supply device of the present invention includes the power supply unit provided between the external power and the load so that the charging power can be supplied to the load during a period in which the use of external power must be reduced.

Further, the power supply unit can reliably protect the battery provided in the power supply unit by providing the charging power to the load until the charging power is satisfied.

DETAILED DESCRIPTION

Figure 1:
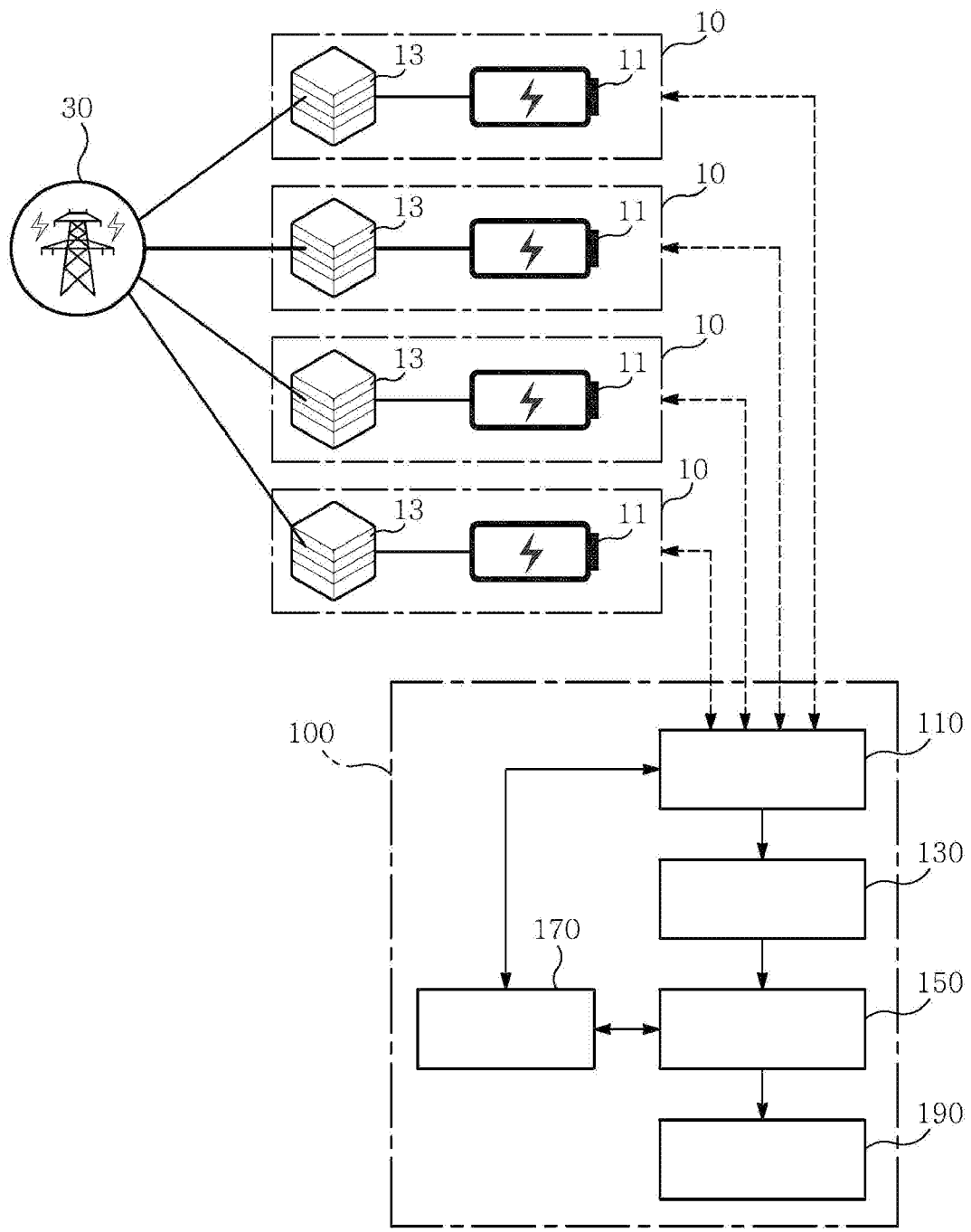
FIG. 1 is a block diagram showing an on-site ESS management device according to the present invention.

FIG. 1 is a block diagram showing an on-site ESS management device according to the present invention.

The on-site ESS management device 100 shown in FIG. 1 may include an editing unit 110, a selection unit 130, a management unit 150, a display unit 190, and a storage unit 170.

A plurality of grid units 10 including at least one of a battery 11 and a power converter (PCS) 13 connected to the battery may be provided. Each of the grid units may be provided at sites separated from each other, which are difficult to manage with a single power management system (PMS).

The battery may store external power or discharge the stored power according to instructions from the management unit.

The power converter may include an AC-DC converter, a DC-AC converter, a DC-DC converter, and the like.

The editing unit 110 may selectively group a plurality of grid units. In other words, the editing unit 110 may create various groups according to the user's selection.

The selection unit 130 may select a specific group from among a plurality of groups.

The management unit 150 may manage power input and output of each grid unit included in a specific group. The management, herein, may include charging/discharging control and monitoring of the battery, power conversion control and monitoring of the power converter, and the like.

The display unit 190 may display an interface including the management information of the specific group selected by the selection unit 130, excluding the management information of the remaining groups unselected by the selection unit 130. The display target of the display unit 190 may be consistent with management target of the management unit 150.

An energy storage system (ESS) may consist of a battery, a power converter (PCS), and a PMS. An EMS may be added as a higher manager of the PMS.

The PMS issues and controls the instructions so that the battery is charged using the external power provided from the power supplier 30 and the PCS is converted in power in connection with battery management system (BMS) information provided in the battery and PCS status information when the customer wants to charge the battery. Along with this, the PMS may provide an interface corresponding to the algorithm and UI necessary for monitoring and management. In order to manage the energy storage state, the PMS performs various functions, in which the functions are different depending on options for each storage capacity and each operation device.

The management unit 150 may provide substantially the same function as the PMS. There is a difference in that the management target of the management unit 150 is a specific group selected by the selection unit 130, whereas the management target of the PMS is a predetermined fixed group of grid units.

A grid unit selected by the user may be included in the specific group by the editing unit 110. The user may freely edit the specific group to be managed by the management unit 150 using the editing unit 110. As a result, the user may incorporate a specific grid unit into the management target of the management unit 150 as desired or exclude a specific grid unit from the management target.

A first grid unit may be provided on the first floor of a building A, and a second grid unit may be provided on the second floor thereof. A second grid unit may be provided on the first floor of the building B, and a fourth grid portion may be provided on the second floor thereof.

As a comparative example, a method of managing a general PMS will be described.

When the first grid unit, the second grid unit, the third grid unit, and the fourth grid unit are set as management targets of a PMS according to the request of a business owner, the PMS may manage all four grid units.

Thereafter, the business owner may make a request for the PMS to manage only the first grid unit and the second grid unit. Herein, the administrator of the PMS may delete the third grid unit and the fourth grid unit of the existing management targets from the program. The third grid unit and the fourth grid unit may be managed by the PMS which is newly added.

Thereafter, the business owner may make a request for the corresponding PMS to manage the first grid unit, the second grid unit, the third grid unit, and the fourth grid unit. In this case, the administrator of the PMS inconveniently has to embed the management module of the third grid unit and the management module of the fourth grid unit into the PMS again. Meanwhile, the business owner may be frustrated that his/her demand is not satisfied promptly.

According to the present invention, the administrator of the PMS may initially group the first grid unit, the second grid unit, the third grid unit, and the fourth grid unit into one group ESS #1 according to a request of the business owner. Thereafter, when selecting the ESS #1 using the selection unit 130, the management unit 150 may manage all of the first grid unit, the second grid unit, the third grid unit, and the fourth grid unit.

Thereafter, according to the request of the employer, the administrator of the PMS may group the first grid unit and the second grid unit into one group ESS #2 using the editing unit 110. Then, when the selection unit 130 is used to select the ESS #2, the management unit 150 may manage the first grid unit and the second grid unit.

When the management authority for the remaining third grid unit and fourth grid unit is transferred to the management unit 150 which is newly added, the administrator groups the third grid unit and the fourth grid unit into one group ESS #3. When testing power management efficiency, it is possible to check test results for the group ESS #3 using the existing management unit 150, instead of the new management unit 150. For example, through the simple operation of selecting the ESS #3 through the selection unit 130, the existing management unit 150 may manage the third grid unit and the fourth grid unit.

Thereafter, when the employer makes a request to manage the first grid unit, the second grid unit, the third grid unit, and the fourth grid unit, the administrator may allow the management unit 150 to manage all grid units through a simple procedure of selecting the ESS #1 using the selection unit 130.

In order to allow free grouping, the editing unit 110 may acquire identification information in advance, from a maximum number of grid units that may be managed by the management unit 150. Herein, the identification information of the grid unit may include an identification code and a communication address of a battery, particularly, BMS installed in the battery, an identification code and a communication address of a power converter, and the like.

The editing unit 110 may provide an edit menu EDIT that may group the grid units freely within the maximum number using the acquired identification information.

Figure 2:
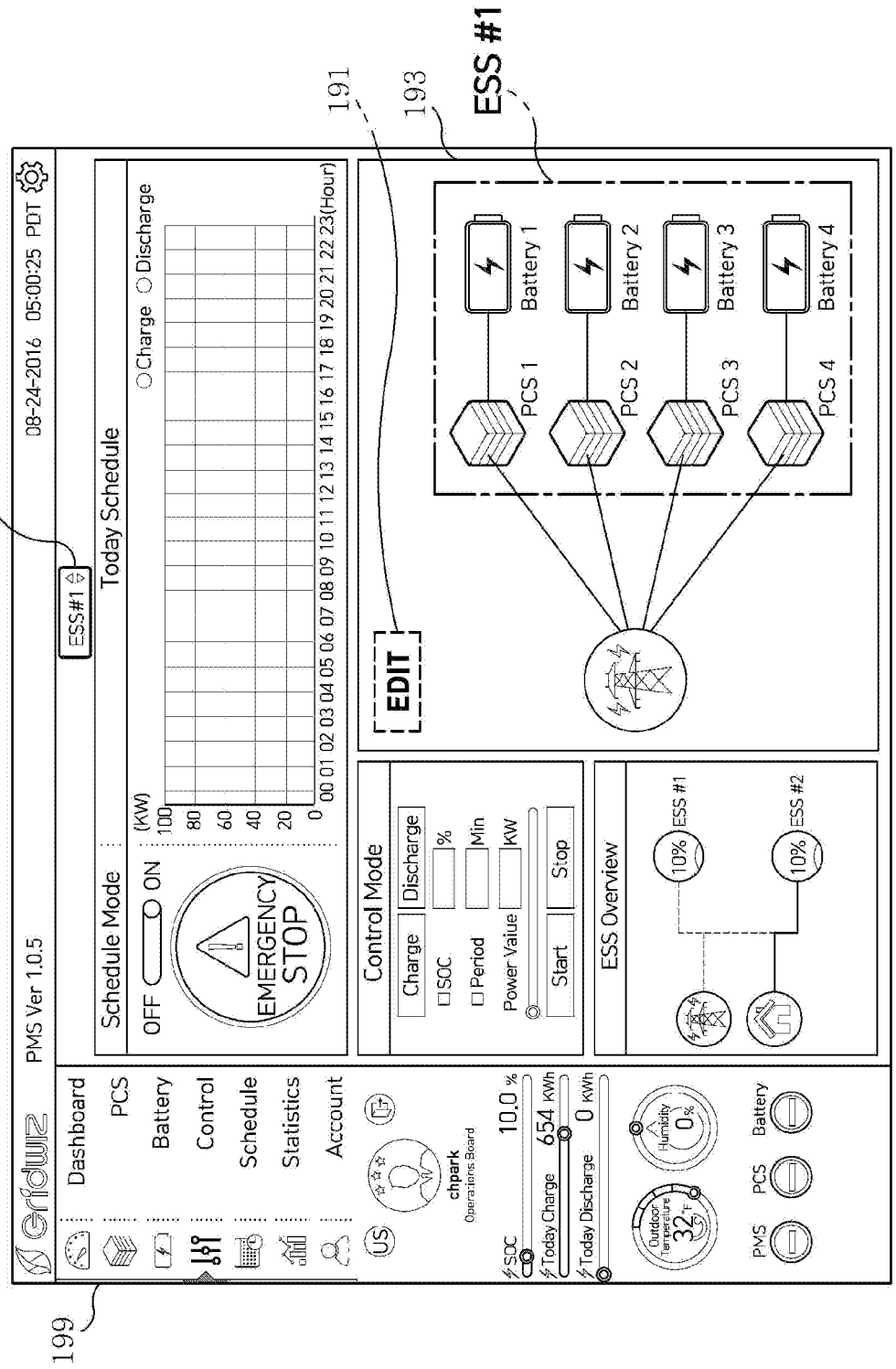
FIG. 2 is a schematic diagram showing an interface displayed on a display by a display unit.

FIG. 2 is a schematic diagram showing an interface displayed on a display by a display unit 190.

The interface may additionally include various menus for managing the power of the grid unit. The interface may be provided with a display window displaying the grid units contained in a specific group managed by the management unit 150. FIG. 2 shows that a group ESS #1 including four grid units as a specific group may be selected through a selection menu connected to the selection unit 130.

When the edit menu EDIT is selected, the display window may be replaced with an edit window capable of grouping a plurality of grid units.

For example, a maximum number of grid units may be displayed in the edit window. The user may select and group some of the maximum number of grid units. When a group grouped through the edit window is different from the existing group, the editing unit 110 may assign a name of the new group such as ESS #5.

The interface unit may be provided with a selection menu that selects each group by selecting a group name. The group displayed in the display window may be changed easily through the selection menu.

When constructing a large-capacity, high-cost, high-efficiency ESS system, installation cost including initial equipment purchase cost may increase exponentially. Also, in a case that a single ESS system is operated for energy efficiency of the entire customers, when there is a problem with the PMS controlling the ESS, there may be a limit to overcome the obstacle.

According to the present invention, a ESS (battery-PCS-PMS structure) of medium to large capacity is replaced with a popular ESS (battery-PCS structure) of low cost so that the ESS of low cost is provided at the installation site, and the management unit 150 managing each grid unit may be configured with a micro PMS that may operate with low computing power at an embedded level.

Considering a processing load of the management unit 150 configured with the micro PMS in a hardware manner, the management unit 150 may manage each grid unit included in the group selected by the selection menu and displayed in the display window, meanwhile the management unit may not manage the remaining grid units.

In order to manage each group independently, a management module for managing the power input and output of the grid unit using the identification information of the grid unit may be provided for each group. Herein, since each management module may be formed by program, a plurality of management modules may be easily stored in a small storage unit 170.

Figure 3:
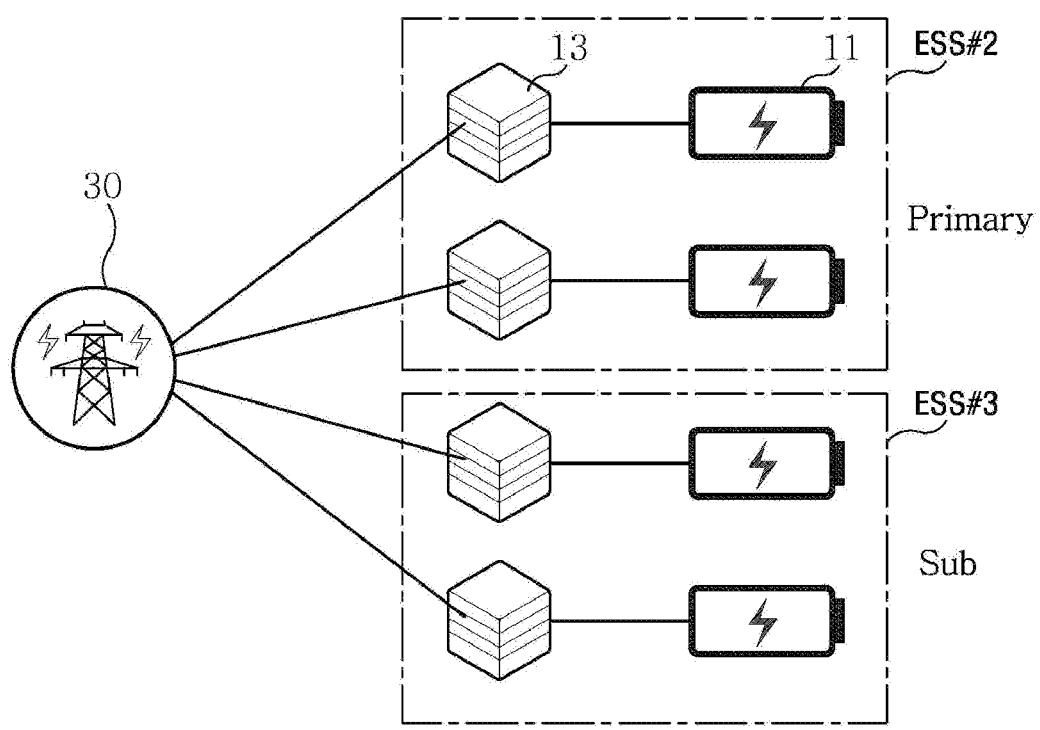
FIG. 3 is a schematic diagram showing grouping performed by the editing unit of the present invention.

FIG. 3 is a schematic diagram showing grouping performed by the editing unit 110 of the present invention.

Referring to FIG. 3, the first grid unit, the second grid unit, the third grid unit, and the fourth grid unit exist from the top to the bottom.

In this case, the first grid unit and the second grid unit are grouped into one group ESS #2, and the second grid unit and the third grid unit are grouped into one group ESS #3, through the editing unit 110.

Herein, the management unit 150 may be provided with the second management module for managing the group ESS #2 and the third management module for managing the group ESS #3. As described above, when a group ESS #1 additionally exists, a first management module managing the ESS #1 may additionally be provided in the management unit 150.

The management unit 150 may extract, from the storage unit 170, a management module for managing a specific group that is newly changed every time a specific group is changed by the selection unit 130 and operate the management module. According to this, the management unit 150 is a PMS that manages only a specific group at a certain point in time and excludes the remaining groups except the specific group.

On the other hand, the management module managing the remaining groups may be a surplus management module that is not operated. The surplus management module may operate as a redundancy means of the PMS that manages only a specific group.

For example, the management unit 150 may set a management module that manages another group different from the specific group as a sub management module.

When a specific group is selected by the selection unit 130, the sub management module may monitor a primary management module that manages the specific group, instead of managing other groups.

FIG. 3 illustrates a case where the second management module of the group ESS #2 becomes a primary management module and the third management module of the group ESS #3 becomes a sub management module.

Figure 4:
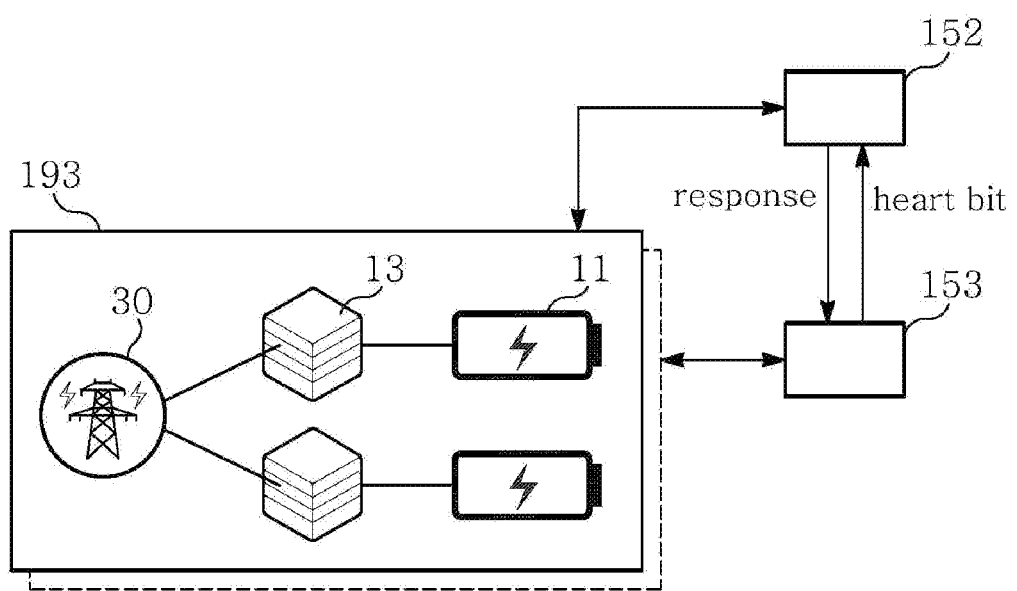
FIG. 4 is a schematic diagram showing redundancy realized by the management unit of the present invention.

FIG. 4 is a schematic diagram showing redundancy performed by the management unit 150 of the present invention.

The sub management module may manage the specific group instead of the primary management module when an error occurs in the primary management module.

As an example, the primary management module may receive the management information periodically or in real time. Suddenly, when the sub management module replaces the primary management module, the sub management module cannot know at what point in time to mange the specific group. When the sub management module receives the management information, the sub management module may manage the specific group continuously from that point in time to receive the information.

The sub management module may transmit a heart bit signal to the primary management module. The sub management module may manage the specific group using the final management information received from the primary management module when there is no response to the heart bit signal from the primary management module. Since the third management module corresponding to the sub management module corresponds to a surplus management module not selected by the selection unit 130, the sub management module may not manage the ESS #3. Since the third management module has the ability to manage other groups, it is possible to manage a specific group. However, the identification information of the grid unit included in the third management module should be replaced with the identification information of the grid unit included in the specific group. Identification information of a grid unit included in the specific group may be provided through the editing unit 110 or included in the management information received from the second management module.

According to the on-site ESS management device of the present invention, a plurality of grid units arranged in different sites may be freely grouped and managed. For example, when all grid units are grouped into a group, the management unit 150 may serve as an EMS that is higher than the PMS. As another example, when some grid units are grouped into one group, the management unit 150 may be faithful to the PMS's function to manage some grid units. Which function is used depends on the grouping determined by a user, whereby the user has the advantage of utilizing the management unit 150 in various manners.

In addition, since it is possible to easily switch between groups through the selection unit 130, a plurality of groups may be managed through one management unit 150. Alternatively, there is an advantage that grouping can be obtained in a combination that enables an optimum power demand reduction according to power demand fluctuation information that changes from moment to moment and a request from a superior.

The management unit 150 may support switching between groups while replacing entire program managing each group. Since the management module corresponding to the program that manages each group exists, it is possible to use the surplus management module for other purposes.

The management unit 150 can be configured with small or inexpensive hardware because it is focused on the function of the PMS that manages only a specific group. Herein, the management module managing the remaining groups can maintain a standby state in which the remaining groups are not managed, and the redundancy of the management modules managing the specific group using the surplus resources can be realized.

The invention claimed is:

1. An on-site energy storage system (ESS) management device, comprising:
    when a plurality of grid units including at least one of a battery and a power converter connected to the battery is provided, an editing unit selectively grouping the plurality of grid units;
    a selection unit selecting a specific group;
    a management unit managing power input and output of each grid unit included in the specific group; and
    a display unit displaying an interface in which management information of the specific group selected by the selection unit is included except management information of remaining groups.

2. An on-site energy storage system (ESS) management device, comprising:
    when a plurality of grid units including at least one of a battery and a power converter connected to the battery is provided, an editing unit selectively grouping the plurality of grid units;
    a selection unit selecting a specific group; and
    a management unit managing power input and output of each grid unit included in the specific group,
    wherein the editing unit acquires identification information in advance from a maximum number of grid units capable of being managed by the management unit, and
    the editing unit provides an editing menu capable of freely grouping the grid units within the maximum number using the identification information acquired in advance.

3. The device of claim 1, further comprising:
    when a management module managing the power input and output of the grid unit is provided for each group using identification information of the grid unit, a storage unit storing the multiple management modules,
    wherein whenever the specific group is changed by the selection unit, the management unit extracts a management module managing a specific group that is newly changed from the storage unit and thus operates the management module.

4. An on-site energy storage system (ESS) management device, comprising:
    when a plurality of grid units including at least one of a battery and a power converter connected to the battery is provided, an editing unit selectively grouping the plurality of grid units;
    a selection unit selecting a specific group; and
    a management unit managing power input and output of each grid unit included in the specific group,
    wherein the management unit is provided with a management module managing the power input and output of the grid unit for each group,
    the management unit sets a management module managing other group different from the specific group as a sub management module, and
    the sub management module monitors a primary management module managing the specific group instead of managing the other groups when the specific group is selected by the selection unit, and manages the specific group on behalf of the primary management module when there is an error with the primary management module.

5. The device of claim 4, wherein the sub management module receives management information of the primary management module in real time, and
    the sub management module transmits a heart bit signal to the primary management module and manages the specific group by using final management information received from the primary management module when there is no response to the heart bit signal from the primary management module.

6. The device of claim 1, wherein the management unit is a power management system (PMS) that manages only the specific group at a certain point in time and excludes remaining groups except the specific group, and
    a surplus management module managing the remaining groups operates as a redundancy means of the PMS.

* * * * *